United States Patent [19]

Huhn et al.

[11] Patent Number: 5,712,049
[45] Date of Patent: Jan. 27, 1998

[54] SLIDING ELEMENT AND PROCESS FOR PRODUCING THE SAME

[75] Inventors: Hans-Ulrich Huhn, Schlangenbad; Klaus Muller, Wiesbaden, both of Germany

[73] Assignee: Glyco-Metall-Werke Glyco B.V. & Co. KG, Wiesbaden, Germany

[21] Appl. No.: 436,417

[22] PCT Filed: Nov. 24, 1993

[86] PCT No.: PCT/DE93/01131

§ 371 Date: Jul. 27, 1995

§ 102(e) Date: Jul. 27, 1995

[87] PCT Pub. No.: WO94/12688

PCT Pub. Date: Jun. 9, 1994

[30] Foreign Application Priority Data

Nov. 27, 1992 [DE] Germany ............... 42 39 851.7
Nov. 24, 1993 [DE] Germany ............... 43 40 073.6

[51] Int. Cl.[6] ............... B32B 15/20; C25D 5/30; C25D 5/44; F16C 33/12
[52] U.S. Cl. ............... 428/646; 428/650; 428/935; 205/213; 384/912
[58] Field of Search ............... 428/650, 651, 428/652, 646, 647, 648, 935, 658; 205/213, 210, 300, 302; 384/912

[56] References Cited

U.S. PATENT DOCUMENTS

| 2,676,916 | 4/1954 | Zelley | 205/213 |
| 2,734,024 | 2/1956 | Schultz | 205/213 |
| 2,745,799 | 5/1956 | Patrie | 205/213 |
| 2,766,195 | 10/1956 | Combs et al. | 205/213 |
| 3,616,291 | 10/1971 | Wilson | 205/213 |
| 3,969,199 | 7/1976 | Berdan et al. | 205/213 |
| 4,100,038 | 7/1978 | Jongkind | 204/38 B |
| 4,225,397 | 9/1980 | Napier | 204/29 |

FOREIGN PATENT DOCUMENTS

| 0 500 015 A1 | 8/1992 | European Pat. Off. |  |
| 2 469 465 | 5/1981 | France | 205/213 |
| 25 22 926 | 6/1978 | Germany . |  |

*Primary Examiner*—John Zimmerman
*Attorney, Agent, or Firm*—Lawrence J. Shurupoff

[57] ABSTRACT

A sliding element has a bearing metallic layer made of aluminum or an aluminum alloy which bears on its side facing the sliding surface a galvanically produced tin layer bonded to the bearing metallic layer by a very thin alkaline, halogen-free layer of zinc, copper, nickel and iron immersion deposited on the bearing metallic layer. To produce such sliding element, a highly-alkaline immersion bath is used containing salts of zinc, nickel, copper and iron mainly cyanide-based. After the immersion treatment, the sliding element blank is rinsed with considerably carbonic acid-free deionized water. During a first tinning step, the sliding element is treated in a bath at a temperature between 20° and 26° C. with a current intensity from 2 to 3 amperes/dm$^2$ and for a duration of exposure of at least one minute.

18 Claims, 2 Drawing Sheets

SLIDING ELEMENT AND PROCESS FOR PRODUCING THE SAME

This application is a 371 of PCT/DE93/01131,filed Nov. 24, 1993.

BACKGROUND OF THE INVENTION

1. Field of the Invention

The invention relates to a plain bearing having an electroplated tin layer bonded to an aluminum containing layer by a halogen free deposition containing zinc, copper, nickel and iron.

2. Description of Prior Developments

Compound plain bearings comprise a supporting steel shell with a layer of anti-friction metal which is mostly of an aluminum-tin alloy. In the majority of cases, the running surface of the bearing must be additionally provided with a usually electroplated coating of an alloy whose hardness is much lesser than that of the aluminum-tin alloy. The aluminum-tin anti-friction metal is itself capable of very limited conformation to the steel shaft during the running-in phase. The conformation process consists essentially of plastic deformation and also partial abrasion of the anti-friction coating. Aluminum-tin layers minimally plastically conform to the shaft and are not abraded with simultaneous smoothing of the running surface in the regions of the sliding surface which are in a state of mixed friction due to the geometrical imperfection of the bearing shell and shaft. Instead, in adverse conditions, roughening even scratching takes place in the hard regions. The formation of the lubricant film of uniform thickness is impaired by these variations in the running surface and local mixed friction which should be limited to the brake-in phase remains so that even after a relatively short operating time the bearing may be significantly damaged.

In order to improve the conformability of the bearing by deposition of a soft layer, the problem of electrochemical deposition onto aluminum alloys had to be solved.

From DE-AS 10 48 757 it is known to provide between the aluminum alloy and the overlay a silver layer to achieve better adhesion between the aluminum and the running surface. However, the silver bonding layer known from DE-AS 10 48 757 has the disadvantage that it must be at least 2.5 um thick to obtain sufficient bond to the thin zinc layer situated below it and to the backing layer of aluminum material. Moreover, deposition of the conventional silver bonding layer by electroplating is associated with critical working conditions so that the silver bonding known from DE-AS 10 48 757 was not successful in actual practice.

From DE-OS 15 33 214 it is known, for instance, to provide an intermediate layer of nickel between an outer layer of copper and inner layer of lead and tin. Nickel as a bonding base has been known to be successful in bearings for a long time in conjunction with surface-hardened shaft journals, which is the case with smaller engines. In such cases, it is relatively safe when after long operating times the soft outer layer is locally worn down to the nickel layer and the shaft gets into contact with nickel. The conditions are, however, different in the case of large diesel engines with soft journals.

Nickel deposited by electroplating on a bearing has a hardness which is higher than the surface hardness of shafts which are not surface-hardened. If, after wearing of the electroplated layer, the journal of the shaft reaches the nickel bonded base, two nearly equally hard materials, which are also very similar metallurgically, slide in contact with each other. This desirable pairing of elements in sliding contact causes wear of the journal which initially manifests itself as roughening and, in an advanced stage, ultimately as scratching.

In addition to its undesirable high hardness, the nickel layer also behaves adversely in another respect. At operational temperatures existing in a bearing, intermetallic phases may be formed within some thousands of operational hours between the nickel and tin, the hardness of the intermetallic phases being much greater than that of a layer of pure nickel. If the wear of the overlay proceeds slowly, the shaft comes into contact with the intermetallic layer which meanwhile has acquired a thickness of several um, and which then causes heavy wear to the shaft.

The deposition of a layer of pure tin without an intermediate layer of nickel onto an aluminum bearing alloy is not possible because a sufficient bond to the aluminum bearing alloy cannot be achieved. After a relatively short time of operation, delamination of the tin layer occurs. It was therefore attempted to deposit the tin layer directly onto the aluminum bearing alloy using a chemical process. The aluminum bearing alloy is pretreated by an alkaline and an acid cleaning agent. Then, using an activator, the surface is pretreated for the tin layer to be subsequently deposited by immersion in a tin solution. This tin layer, deposited chemically without an intermediate layer, results in failures relatively quickly. It could be verified on a test bench for connecting rod bearings that bearings provided with a tin layer in this way fail at oil inlet temperatures as low as 100° C. before the test rpm of 6700/min is reached.

A similar process is known from EP 0 234 738 A1 in which, before the deposition of a tin layer by electroplating, treatment in an immersion bath is carried out. This is an acid immersion bath which contains free metal ions, such as nickel or copper ions, or complexly bonded metals, in the course of which halogen ions are necessarily present. Acid immersion solutions, whose components contain nickel and halogens, tend to cause surface corrosion of aluminum.

Deposited tin layers are therefore not stable and adhesion tests (adhesive strip tests) have shown that the tin layer undergoes partial delamination up to 30% of the layer of aluminum or aluminum alloy. If the coated parts are subjected to a blister test lasting for four hours at a temperature at 160° C., blistering occurs, which indicates gas occlusions which contribute to the delamination of the tin layer.

Nickel immersion coating is known also from Chemical Abstracts, vol. 98 (1983), p. 547, no. 224260W, where acid solutions were used as well. Moreover, this treatment did not result in a thin immersion deposition but in a true nickel layer comparable to a nickel intermediate layer according to DE-OS 15 33 214.

SUMMARY OF THE INVENTION

It is, therefore, the object of the invention to produce a sliding element which has a better adhering functional tin layer without another intermediate metallic layer on the layer of bearing material. It is also the aim of the invention to devise a process for the production of such sliding elements.

Surprisingly, it was found that an electroplated tin layer adheres much better if the tin layer is bonded through an alkaline immersion deposition containing zinc, copper, nickel and iron. Alkaline immersion deposition results in a compatible surface treatment which provides much better adhesion of the tin layer. A blister test performed for four hours at 160° C. showed no formation of blistering. No delamination of the tin layer could be detected.

The alkaline immersion deposition causes a surface reaction with the aluminum, whereby the surface is so changed that the tin layer can be properly anchored on the layer of bearing metal. Presumably, the fact that complexly bonded anions are present in the immersion solution and the metals are complexly bonded contributes to this, given that the salts are halogen-free.

In contrast to the relatively thick intermediate layers, the immersion deposition has a thickness below 1 um, preferably below 0.3 um.

The functional tin layer is preferably formed as a layer protecting against corrosion of a thickness of between 1 um and 5 um. The tin layer may also be thicker and made as a running-in layer with a thickness of between 5 um and 50 um.

It was found that the sliding element has outstanding properties when certain limiting values are observed as regards the proportions contained in the aluminum alloy. When the layer of bearing metal is based on a tin-containing alloy, the proportion of tin may be up to 22.5%. When the proportion of tin is higher, the bond of the layer of pure tin on the layer of bearing metal is degraded.

When a lead-bearing aluminum alloy is used, the proportion of lead is preferably up to 20%. In case of a silicon-containing aluminum alloy, a proportion of silicon of up to 10% is possible.

The process according to the invention provides (1) that the preformed sliding element blanks, coated with a bearing metal layer, are after degreasing, pickling and cleaning of the surface of the bearing metal layer with a highly alkaline aluminum immersion bath which contains salts of zinc, nickel, copper and iron in a predominantly cyanide base; and (2) that after the immersion treatment the sliding element blanks are rinsed with considerably carbonic acid-free water and that at least in one first tin-plating step are provided a bath temperature between 20° and 26° C., the current density of 1 to 3 A/dm$^2$ and duration of exposure of at least 1 minute.

In order to produce the carbonic acid-free, deionized water, the water is, before rinsing, treated by an exchanger with resins which are capable of binding carbonic acid. It was found that water containing carbonic acid is too aggressive and can damage the immersion deposition which in turn leads to a premature delamination of the electroplated tin layer. It is further advantageous when the water has a temperature of 24° to 26° C.

The Ph value of the immersion bath is 12 to 14, preferably 14.

The treatment is preferably carried out in an aluminum immersion bath at room temperature, which is understood to mean at least 20° C. for 15 to 16 seconds.

Preferably an aluminum immersion bath is used which contains 10 to 20 g/l of zinc, 5 to 10 g/l of nickel, 1 to 2 g/l of copper and small quantities of iron in the form of complexly bonded salts.

Due to the immersion deposition, only certain electrolytes may be used for tin plating using the electroplating method. It was found that, for instance, a fluoroborate bath is too aggressive and damages the immersion layer. If a tin-containing aluminum bearing alloy is to be provided with an electroplated tin layer, the tin plating bath has preferably the following composition:

| | |
|---|---|
| tin | 18–22 g/l |
| sulfuric acid | 180–220 g/l |
| wetting agent | 8–12 g/l and |
| grain refinement agent | 18–22 g/l, | while anodes of pure tin are used. This sulphate tin plating may be used also for pure aluminum bearing metals or silicon-containing aluminum bearing metals.

If a lead-containing aluminum bearing metal is to be tin plated, the tin bath preferably exhibits the following composition:

| | |
|---|---|
| tin | 15–30 g/l |
| methane sulfonic acid | 12–180 g/l |
| wetting agent | 15–25 g/l and |
| grain refinement agent (aromatic ketones). | 8–12 g/l |

It was found to be particularly advantageous when the sliding element blanks are subjected to a multi-step pretreatment in which they are several times immersed in a mixed acid bath of sulfuric acid and chromium oxide.

BRIEF DESCRIPTION OF THE DRAWINGS

Embodiments will now be explained in greater detail, by way of example, with reference to the drawings, in which.

DETAILED DESCRIPTION OF THE PREFERRED EMBODIMENTS

Figure 1:
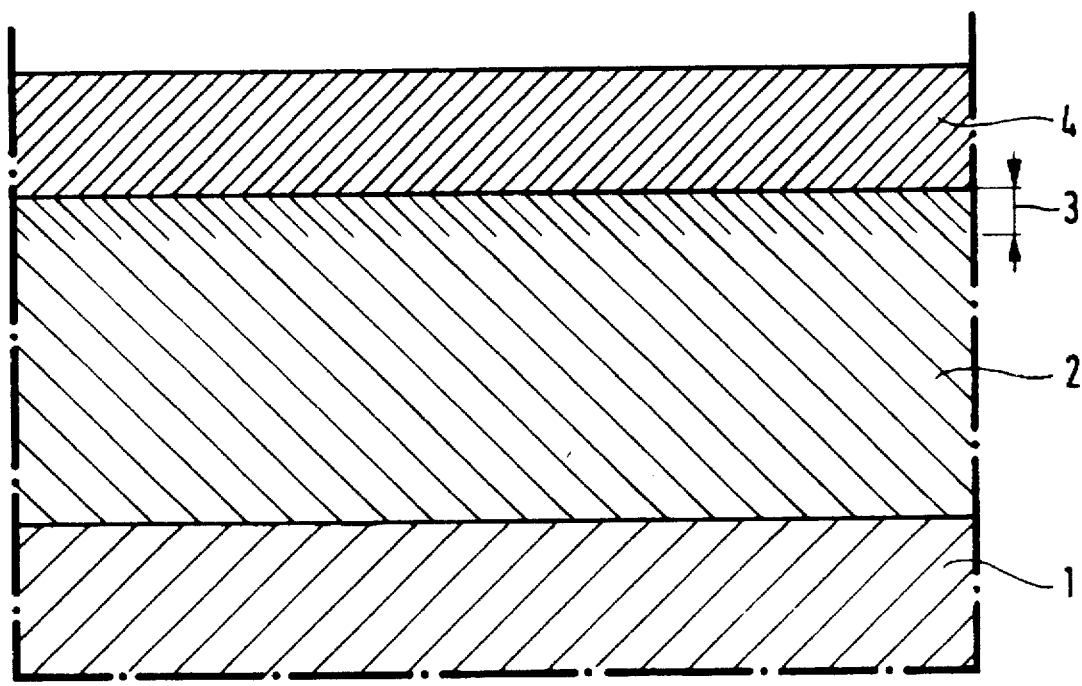
FIG. 1 is a section through a sliding element according to the invention.
Figure 2:
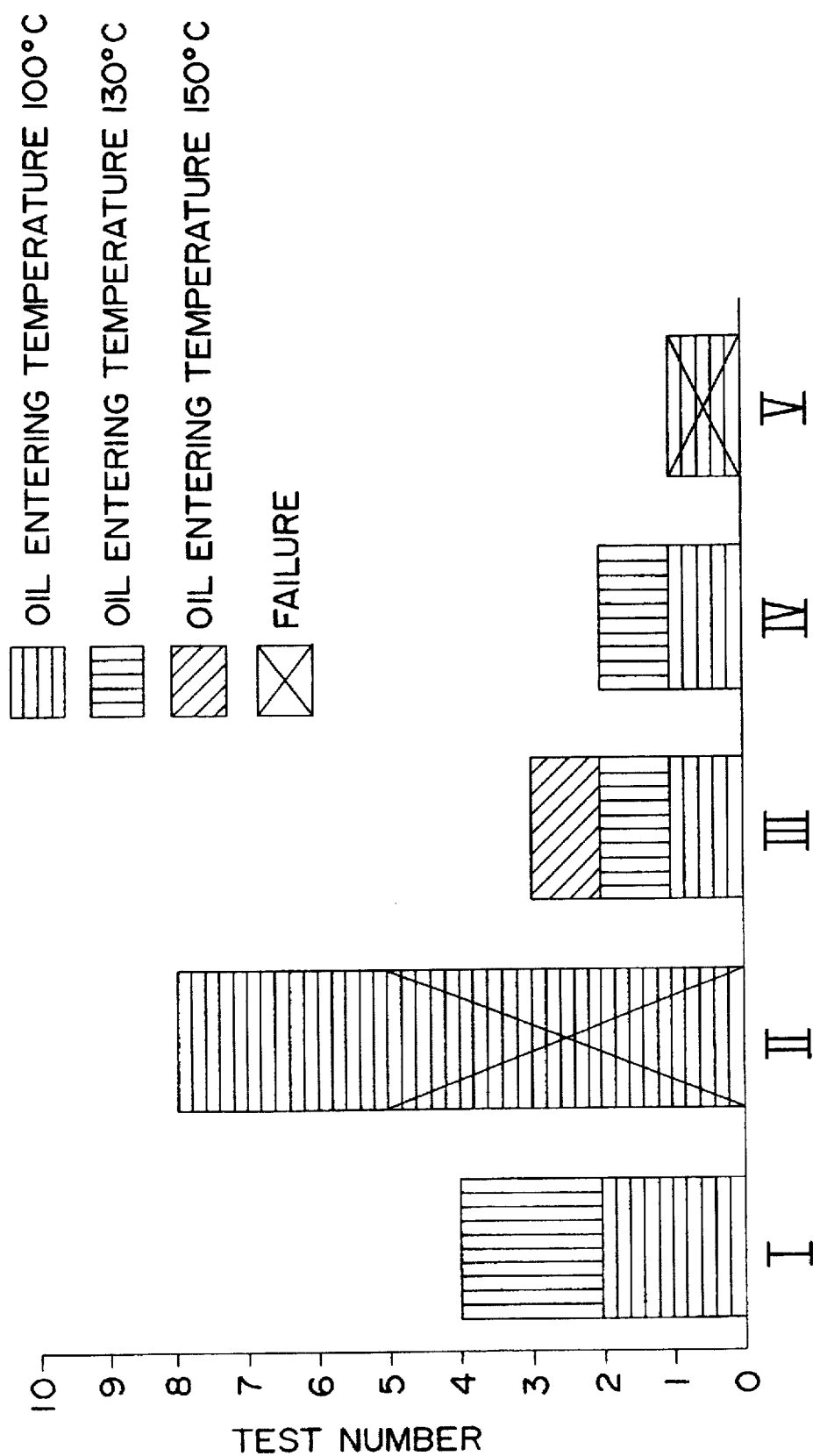
FIG. 2 is a bar chart showing, by way of comparison, tests of various plain bearings.

FIG. 1 shows a sliding element in section. On a steel backing 1 is deposited a bearing metal layer 2 of pure aluminum or an aluminum alloy containing silicon, lead or tin. The surface reaction caused by the immersion deposition is indicated by the region 3. Because a surface treatment is involved, this immersion deposition is not a measurable layer deposited on the aluminum bearing alloy 2. Consequently, there is also no distinct border between the immersion deposition 3 and the bearing metal layer 2. On the bearing metal layer 2 treated in this way is deposited a pure tin layer 4 as a functional tin layer.

In the following will be described, in connection with an embodiment of the process, the deposition of a tin layer onto a tin-containing aluminum bearing alloy.

For the fixing of the bearing lines double racks are used. The width of the recesses is 30 mm when the bearing diameter is up to 70 mm. This rack has no lateral baffles and contains no rogue cathode. The process contains the following steps:

Degreasing: twice degreasing the parts in automatic degreasing equipment

Pickling: in a pickling acid of sulfuric acid, hydrofluoric acid and zinc oxide the bearing liners are immersed for 1 minute Rinsing Pickling: in a pickling acid of sulfuric acid and zinc oxide, the bearing liners are immersed for 22 seconds Rinsing: in deionized water for 22 seconds Immersion in acid: immersion in a mixed acid of sulfuric acid and chromium oxide for 1 minute Rinsing Immersion in acid: immersion in a mixed acid of sulfuric acid and chromium oxide for 22 seconds Rinsing Aluminum immersion liquid: the double rack is immersed in the aluminum immersion liquid for 22 seconds; thin oxide layers are dissolved and at the same time metal deposition of nickel, tin and copper is produced.

Rinsing

Sulphate tin plating: the tin electrolyte is composed of 18–22 g/l of tin, 180–220 g/l of sulfuric acid, 10 g/l of wetting agent and 20 g/l of a grain refinement agent; the temperature of the bath is 20° to 26° C.; the sliding elements are tin plated for a period of 2 minutes in a tin-plating bath containing sulfuric acid at a current density of 2 A/dm$^2$.

Rinsing

Drying

All rinsing is carried out with carbonic acid-free water heated to 24° to 26° C.

Plain bearings produced in this way were broached before the electroplating and finally tested on a test bench for connecting rods. The test conditions are summarized in the following Table.

| TABLE NO. | MACH. OF SLIDING SURF. | TOTAL TEST TIME | MAX TIME OF ONE TEST |
|---|---|---|---|
| I | El. plated tin flash with Ni-interm. layer | drilled | 225 h | 105 h |
| II | El. plated tin flash with Ni-interm. layer | broached | 40 h | 15 h |
| III | El. plated tin flash according to the invention | broached | 80 h | 50 h |
| IV | El. plated tin flash according to the invention | broached | 30 h | 50 h |
| V | Chemical tin flash | broached | — | — |

This series of tests has shown that the sliding elements provided with a chemical tin flash even failed at an oil inlet temperature of a mere 100° C. before reaching the test rotational velocity of 6700/min. Only a test rotational velocity of 5200/min could be achieved (No. V).

With plain bearings having an electroplated tin flash and a nickel intermediate layer, failures of more than 50% happen in the case of broached sliding elements (No. II) even at an oil inlet temperature of 100° C.

In plain bearings according to the invention, no failures were noticed at oil inlet temperatures of 150° C.

What is claimed is:

1. A sliding element, comprising a bearing metal layer comprising aluminum and an electroplated tin layer bonded to the bearing metal layer by an alkaline, halogen-free immersion deposition containing zinc, copper, nickel and iron from an immersion bath containing 10 to 20 g/l zinc, 5 to 10 g/l nickel, 1 to 2 g/l copper and a small amount of iron, mainly in the form of cyanide-based salts.

2. The sliding element according to claim 1, wherein the bearing metal layer comprises a tin-containing aluminum alloy containing up to 22.5% of tin.

3. The sliding element according to claim 1, wherein the bearing metal layer comprises a lead-containing aluminum alloy containing up to 20% of lead.

4. The sliding element according to claim 1, wherein the bearing metal layer comprises a silicon-containing aluminum alloy.

5. The sliding element according to claim 1, wherein the immersion deposition has a thickness of less than 1 um.

6. The sliding element according to claim 5, wherein the immersion deposition has a thickness below 0.3 um.

7. The sliding element according to claim 1, wherein the tin layer is formed as a layer having a thickness between 1 um and 5 um.

8. The sliding element according to claim 1, wherein the tin layer is formed as a layer having a thickness between 5 um and 50 um.

9. A process for the production of a sliding element comprising a preformed sliding element blank coated with a bearing metal layer and which, after degreasing, pickling and cleaning of the bearing metal layer, is subjected to successive treatment in an immersion bath and tin-plating by electroplating, wherein said process comprises treating said sliding element in a highly alkaline immersion bath treatment containing salts of zinc, nickel, copper and iron and, after the immersion bath treatment, rinsing the sliding element blank with considerably carbonic acid-free, deionized water, and at least in a first tin-plating step providing a tin-plating bath temperature between 20° and 26° C. with a current density of 1 to 3 A/dm$^2$ and a duration of exposure of at least 1 minute and wherein the immersion bath comprises 10 to 20 g/l zinc, 5 to 10 g/l nickel, 1 to 2 g/l copper and a small amount of iron, and wherein the zinc, nickel, copper and iron have the form of salts, mainly cyanide based.

10. The process according to claim 9, wherein the immersion bath treatment is carried out at a temperature of at least 20° C. for a period of between 15 to 60 seconds.

11. A process according to claim 9, wherein the bearing metal layer comprises aluminum and wherein the tin plating is carried out in a tin-plating bath comprising the following concentrations:

| tin | 18–22 g/l, |
|---|---|
| sulfuric acid | 180–220 g/l, |
| wetting agent | 8–12 g/l, |
| grain refinement agent | 18–22 g/l, and | wherein pure tin anodes are used.

12. A process according to claim 9, wherein the bearing metal layer comprises a lead-containing aluminum bearing alloy and wherein, in a first tin-plating step, tin plating is carried out in a tin-plating bath of a composition comprising the following concentrations:

| tin | 15–30 g/l, |
|---|---|
| methane sulfonic acid | 120–180 g/l, |
| wetting agent | 15–25 g/l, |
| grain refinement agent | 8–12 g/l, and | wherein pure tin anodes are used.

13. The process according to claim 9, wherein the rinsing water has a temperature of 24° to 26° C.

14. The process according to claim 9, wherein the sliding element blank is subjected to a multi-step pretreatment in which it is several times immersed in a mixed acid bath of sulfuric acid and chromium oxide.

15. The process according to claim 14, wherein, after immersion in the mixed acid bath, the sliding element blank is rinsed with carbonic acid-free water.

16. The process according to claim 9, wherein the Ph value of the immersion bath is 12 to 14.

17. A plain bearing, comprising a bearing metal layer comprising aluminum and an electroplated tin layer bonded to the bearing metal layer by an alkaline, halogen-free immersion deposition layer comprising zinc, copper, nickel and iron each in an amount effective, when combined, to securely anchor said tin layer on said aluminum and prevent failure of said tin layer after bench testing at a rotational velocity of 6700 revolutions per minute with an oil inlet temperature of 150° C.

18. A sliding element, comprising a bearing metal layer comprising aluminum and an electroplated tin layer bonded to the bearing metal layer by an alkaline, halogen-free immersion deposition layer comprising zinc, copper, nickel and iron each in an amount effective, when combined, to securely anchor said tin layer on said aluminum and prevent delamination and blistering of said tin layer after blister testing of said sliding element for four hours at 160° C.

* * * * *